US011994186B2

(12) United States Patent
Adkins et al.

(10) Patent No.: US 11,994,186 B2
(45) Date of Patent: May 28, 2024

(54) BRAKE ASSEMBLY HAVING A SENSOR UNIT

(71) Applicant: ArvinMeritor Technology, LLC, Troy, MI (US)

(72) Inventors: Alex Adkins, Troy, MI (US); Daniel Philpott, Troy, MI (US); Sukrut Sakhare, Troy, MI (US)

(73) Assignee: ArvinMeritor Technology, LLC

( * ) Notice: Subject to any disclaimer, the term of this patent is extended or adjusted under 35 U.S.C. 154(b) by 59 days.

(21) Appl. No.: 17/899,975

(22) Filed: Aug. 31, 2022

(65) Prior Publication Data

US 2024/0068536 A1  Feb. 29, 2024

(51) Int. Cl.
 *F16D 66/02*  (2006.01)
(52) U.S. Cl.
 CPC .................................. *F16D 66/024* (2013.01)
(58) Field of Classification Search
 CPC .................................................... F16D 66/024
 See application file for complete search history.

(56) References Cited

U.S. PATENT DOCUMENTS

| 4,344,509 | A | * | 8/1982 | Harmer | F16D 66/024 188/1.11 L |
| 5,839,545 | A | * | 11/1998 | Preston | F16D 66/024 340/454 |
| 6,360,850 | B1 | | 3/2002 | Odisho et al. | |
| 7,165,657 | B2 | | 1/2007 | Palladino | |
| 9,045,122 | B2 | | 1/2015 | Bosis et al. | |
| 2005/0077122 | A1 | | 4/2005 | Harris et al. | |
| 2010/0000826 | A1 | * | 1/2010 | Wille | F16D 66/027 188/1.11 W |
| 2022/0049751 | A1 | | 2/2022 | Shah et al. | |
| 2022/0268330 | A1 | * | 8/2022 | Hsu | F16D 66/024 |

OTHER PUBLICATIONS

Sakhare et al., U.S. Appl. No. 17/676,530, filed Feb. 21, 2022; 37 pages.

* cited by examiner

*Primary Examiner* — Hongmin Fan
(74) *Attorney, Agent, or Firm* — Brooks Kushman PC

(57) ABSTRACT

A brake assembly having a brake pad assembly, a clip, and a sensor unit. The brake pad assembly has friction material that extends from a table. The clip straddles and engages the table. The sensor unit straddles the clip and the table such that the sensor unit engages opposing sides of the clip.

24 Claims, 5 Drawing Sheets

BRAKE ASSEMBLY HAVING A SENSOR UNIT

TECHNICAL FIELD

This relates to a brake assembly that has a sensor unit.

BACKGROUND

A drum brake system having a clip-on electronic lining wear sensor is disclosed in U.S. Patent Publication No. 2005/0077122.

SUMMARY

In at least one embodiment a brake assembly is provided. The brake assembly includes a brake pad assembly, a clip, and a sensor unit. The brake pad assembly has a table and friction material. The friction material extends from the table. The clip straddles and engages the table. The sensor unit straddles the clip and the table such that the sensor unit engages opposing sides of the clip that face away from the table.

The sensor unit may have a first lug. The sensor unit may have a second lug. The first lug and the second lug may cooperate to at least partially define a recess. The clip may be received in the recess. The sensor may be disposed inside the first lug.

The table may include a first table side. The friction material may extend from the first table side. The table may include a second table side. The second table side may be disposed opposite the first table side. The table may include a table end surface. The table end surface may extend between the first table side and the second table side. A gap may be disposed between the table end surface and the clip.

The friction material may include a first friction material portion. The friction material may include a second friction material portion. The channel may be provided between the first friction material portion and the second friction material portion. The first lug may be received in the channel.

The clip may include a first clip arm. The first clip arm may engage the first table side. The first clip arm may engage the first lug. The first lug may extend past a distal end of the first clip arm.

The clip may have a second clip arm. The second clip arm may engage the second table side. The second clip arm may engage the second lug. The second lug may extend past a distal end of the second clip arm.

The clip may include a first side arm. The first side arm may extend from the first clip arm.

The clip may include a second side arm. The second side arm may extend from the first clip arm. The first lug may be disposed between the first side arm and the second side arm. The first side arm may be spaced apart from the second side arm.

The clip may have a third side arm. The third side arm may extend from the second clip arm.

The clip may have a fourth side arm. The fourth side arm may extend from the second clip arm. The second lug may be disposed between the third side arm and the fourth side arm. The third side arm may be spaced apart from the fourth side arm.

The first side arm may have a first hook. The second side arm may have a second hook. The first hook and the second hook may engage a side of the first lug that faces away from the first clip arm. The first hook may extend toward the second hook. The second hook may extend toward the first hook. The first hook may be spaced apart from the second hook such that a passage is provided between the first hook and the second hook.

The third side arm may have a third hook. The fourth side arm may have a fourth hook. The third hook and the fourth hook may engage a side of the second lug that faces away from the second clip arm. The third hook may extend toward the fourth hook. The fourth hook may extend toward the third hook. The third hook may be spaced apart from the fourth hook such that a passage may be provided between the third hook and the fourth hook.

The first lug may have a first slot end wall. The first slot end wall may be disposed in the channel. The first slot may extend from the first slot end wall. The first lot may extend away from a distal end of the first lug.

The first lug may have a first wing. The first wing may be disposed in the channel. The first wing may extend toward the first friction material portion.

The first lug may have a first ramp. The first ramp may be disposed in the channel. The first ramp be spaced apart from the first wing. The first slot may be disposed between the first wing and the first ramp. The first ramp may engage the first friction material portion.

The first lug may have a second ramp. The second ramp may engage the second friction material portion.

A center plane may extend through the first lug in the second lug. The center plane may be positioned between the first friction material portion in the second friction material portion when the first lug is received in the channel. The first ramp may have a first ramp side. The first ramp side may be angled to extend farther from the center plane as the first ramp extends farther from the distal end of the first lug when the first ramp is in a free state. The second ramp may have a second ramp side. The second ramp side may be angled to extend farther from the center plane as the second ramp extends farther from the distal end of the first lug when the second ramp is in a free state.

The first ramp side may have a first set of teeth. The first set of teeth may face away from the center plane. The second ramp side may have a second set of teeth. The second set of teeth may face away from the center plane. The first set of teeth may be offset from the second set of teeth.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
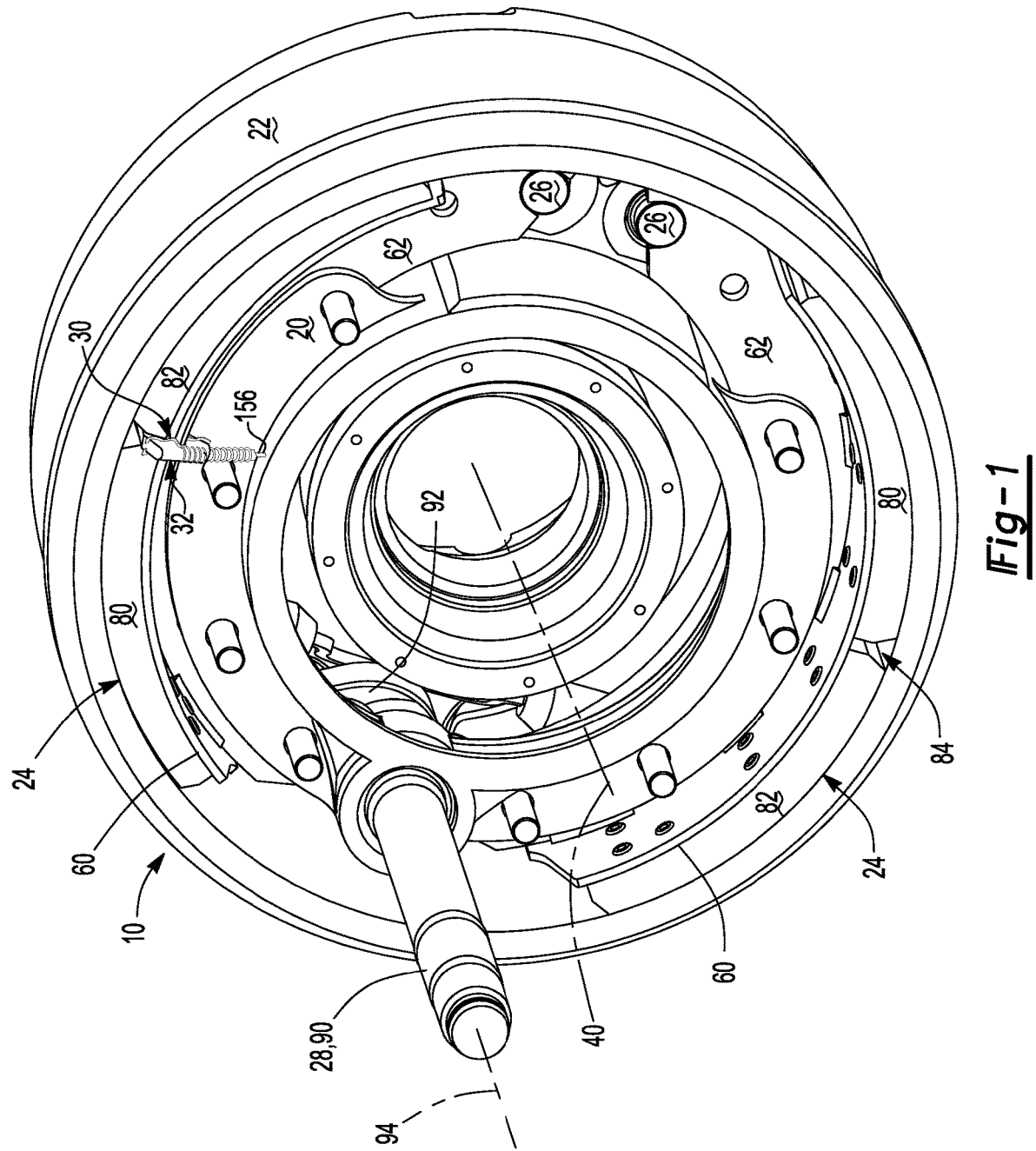
FIG. 1 is a perspective view of an example of a brake assembly.

Referring to FIG. 1, an example of a brake assembly 10 is shown. The brake assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The brake assembly 10 his configured to slow the rotation of a vehicle wheel. In the configuration shown, the brake assembly 10 is depicted as a drum brake assembly. In such a configuration, the brake assembly 10 includes a brake spider 20, a brake drum 22, at least one brake pad assembly 24, at least one anchor pin 26, and a camshaft 28. The brake assembly 10 also includes a clip 30 and a sensor unit 32. In FIG. 1, only one clip 30 and sensor unit 32 is shown; however, it is to be understood that a clip 30 and a sensor unit 32 may be provided with both brake pad assemblies 24.

The brake spider 20 facilitates mounting of the brake assembly 10 to a structural component of the vehicle. For instance, the brake spider 20 may be fixedly mounted to a steering knuckle or an axle housing. The brake spider 20 may be disposed inside the brake drum 22 and may support the anchor pin 26 and the camshaft 28.

The brake drum 22 encircles the brake spider 20 and the brake pad assemblies 24. The brake drum 22 may be fixedly mounted to a wheel hub and may be rotatable with the wheel hub about an axis 40. As such, the brake drum 22 may be rotatable about the axis 40 with respect to the brake spider 20 and the brake pad assemblies 24.

The brake pad assembly 24 is configured to engage an inner surface of the brake drum 22 that faces toward the axis 40 to slow rotation of the wheel hub about the axis 40. In the configuration shown, two brake pad assemblies 24 are illustrated that are disposed generally opposite each other. The brake pad assemblies 24 may be moveably disposed on the brake spider 20 and may partially encircle the brake spider 20. As is best shown with reference to FIG. 2, the brake pad assembly 24 may include a brake shoe 50 and a friction material 52.

The brake shoe 50 is a structural member of a brake pad assembly 24. The brake shoe 50 may be pivotally mounted to the brake spider 20 at a first end via the anchor pin 26, which is shown in FIG. 1. In at least one configuration, the brake shoe 50 includes a table 60 and at least one web 62.

The table 60 supports the friction material 52. The table 60 may be configured as a plate that extends along an arc. In at least one configuration, the table 60 may include a first table side 70, a second table side 72, and at least one table end surface 74.

The first table side 70 may face toward and may engage the friction material 52. As such, the first table side 70 may face away from the webs 62.

The second table side 72 may be disposed opposite the first table side 70. As such, the second table side 72 may face away from the friction material 52 and may face toward the webs 62. In at least one configuration, the second table side 72 may be disposed substantially parallel to the first table side 70. The term "substantially parallel" as used herein means the same as or very close to parallel and includes features or axes that are within ±3° of being parallel each other.

Figure 2:
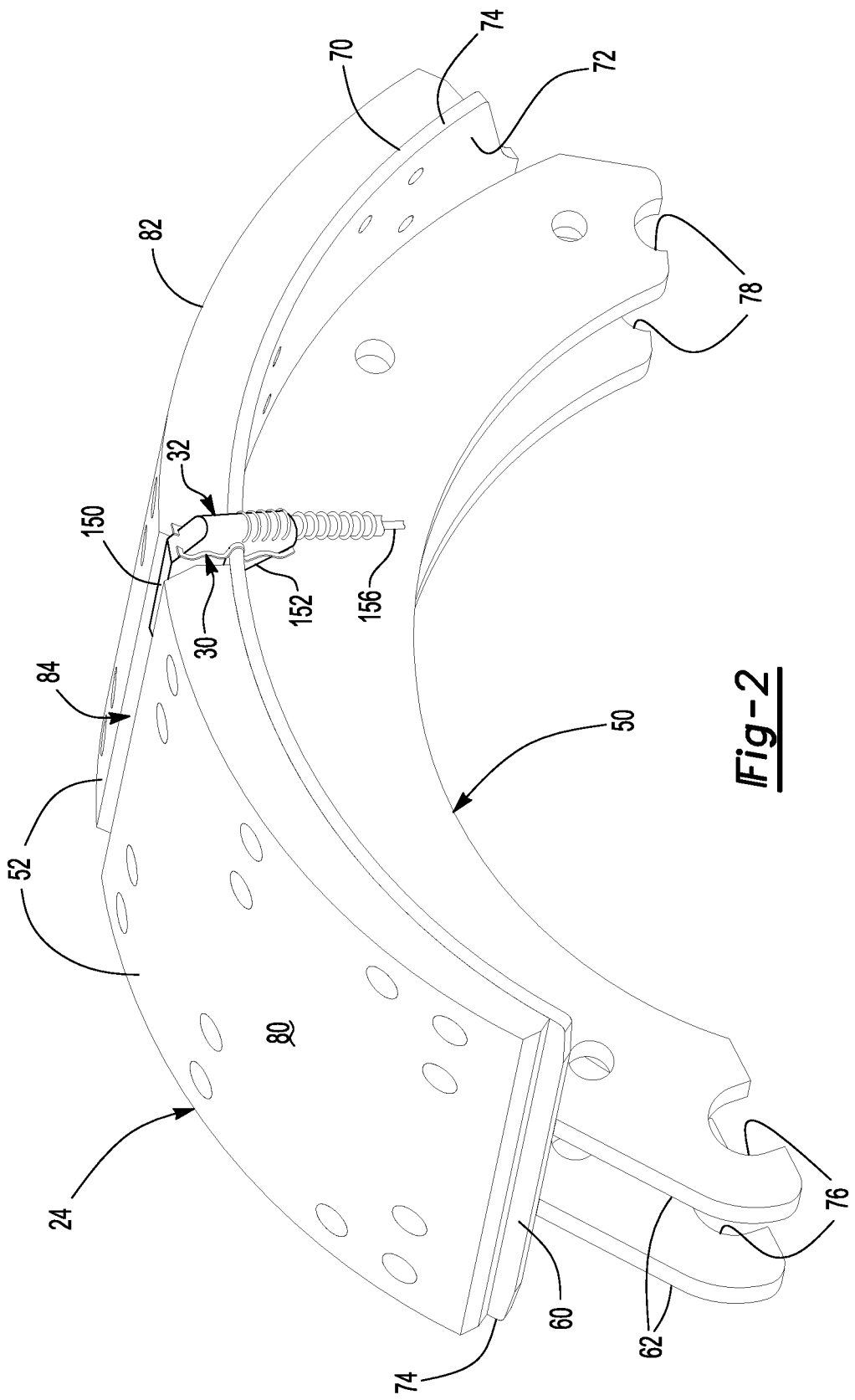
FIG. 2 is a perspective view of a brake pad assembly of the brake assembly and a sensor unit mounted to the brake pad assembly with a clip.

The table end surface 74 may extend between the first table side 70 and the second table side 72. For instance, the table end surface 74 may extend from an end of the first table side 70 to an end of the second table side 72. In at least one configuration, the table end surface 74 may be disposed substantially perpendicular to the first table side 70, the second table side 72, or both. The term "substantially perpendicular" is used herein to designate features or axes that are the same as or very close to perpendicular and includes features that are within ±3° of being perpendicular each other. In FIG. 2, the table end surface 74 extends along an arc and may be spaced apart from the webs 62.

At least one web 62 may be provided with the brake shoe 50. In the configuration shown, two webs 62 are illustrated. The webs 62 extend from the table 60 and may be fixedly coupled to the table 60. For instance, the webs 62 may extend from the second table side 72 in a direction that extends away from the first table side 70 and may be welded to the second table side 72. The webs 62 may be spaced apart from each other and may facilitate mounting of the brake pad assembly 24 to other components of the brake assembly 10. Each web 62 may extend along an arc between a first end and a second end. A first notch 76 may be provided at the first end and may receive the anchor pin 26. A second notch 78 may be provided at the second end and may receive a cam roller that is supported by the camshaft 28.

The friction material 52, which may also be called a brake lining, is disposed on the table 60. The friction material 52 may extend from the first table side 70 in a direction that extends away from the second table side 72. As such, the friction material 52 is oriented to face toward the inner surface of the brake drum 22. The friction material 52 may engage the inner surface of the brake drum 22 during vehicle braking and may be spaced apart from the brake drum 22 when the friction braking is not being applied. The friction material 52 may be attached to the table 60 in any suitable manner. For instance, the friction material 52 may be attached to the table 60 with a plurality of rivets.

In at least one configuration, the friction material 52 may include a first friction material portion 80 and a second friction material portion 82. The first friction material portion 80 and the second friction material portion 82 may be partially spaced apart from each other or completely spaced apart from each other such that a channel 84 is provided between the first friction material portion 80 and the second friction material portion 82. The channel 84 may extend to the first table side 70. In addition, the channel 84 may extend in a direction that extends from one table end surface 74 toward an opposing table end surface 74. In the configuration shown, the channel 84 is oriented substantially perpendicular to the table end surfaces 74.

Referring to FIG. 1, the anchor pin 26 is mounted to the brake spider 20 and supports the brake pad assembly 24. For example, the anchor pin 26 may be fixedly positioned with respect to the brake spider 20 and may be received in the first notches 76 of the webs 62 of the brake pad assembly 24 such that the brake shoe 50 may pivot with respect to the anchor pin 26 about an outer surface or outside circumference of the anchor pin 26 when the brake shoe 50 is actuated by the camshaft 28. It is also contemplated that the anchor pin 26 may be rotatably disposed on the brake spider 20 in other configurations, in which case the brake shoe 50 may pivot with the anchor pin 26. The anchor pin 26 may extend along an anchor pin axis that may be disposed substantially parallel to the axis 40.

The camshaft 28 is configured to actuate the brake pad assemblies 24. The camshaft 28 may have any suitable configuration. For instance, the camshaft 28 may have a shaft 90 and a cam portion 92.

The shaft 90 is rotatable about a camshaft axis 94. The shaft 90 may be rotatably supported on the brake spider 20.

The cam portion 92 extends from the shaft 90. The cam portion 92 may be configured as an S-cam that engages a cam roller that is disposed between the cam portion 92 and the webs 62 of the brake shoe 50. A cam roller may be received in the second notch 78 of the webs 62. Rotation of the camshaft 28 in a first direction about the camshaft axis 94 may cause the cam portion 92 to actuate the cam rollers and the brake pad assemblies 24 such that the friction material 52 moves toward or engages the inner surface of the brake drum 22 to brake or slow or inhibit rotation of an associated wheel. Rotation of the camshaft 28 about the camshaft axis 94 in a second direction that is opposite the first direction may allow the cam rollers and brake pad assemblies 24 to retract or disengage the inner surface of the brake drum 22. The camshaft 28 may be rotated by an actuator as is known by those skilled in the art.

Figure 3:
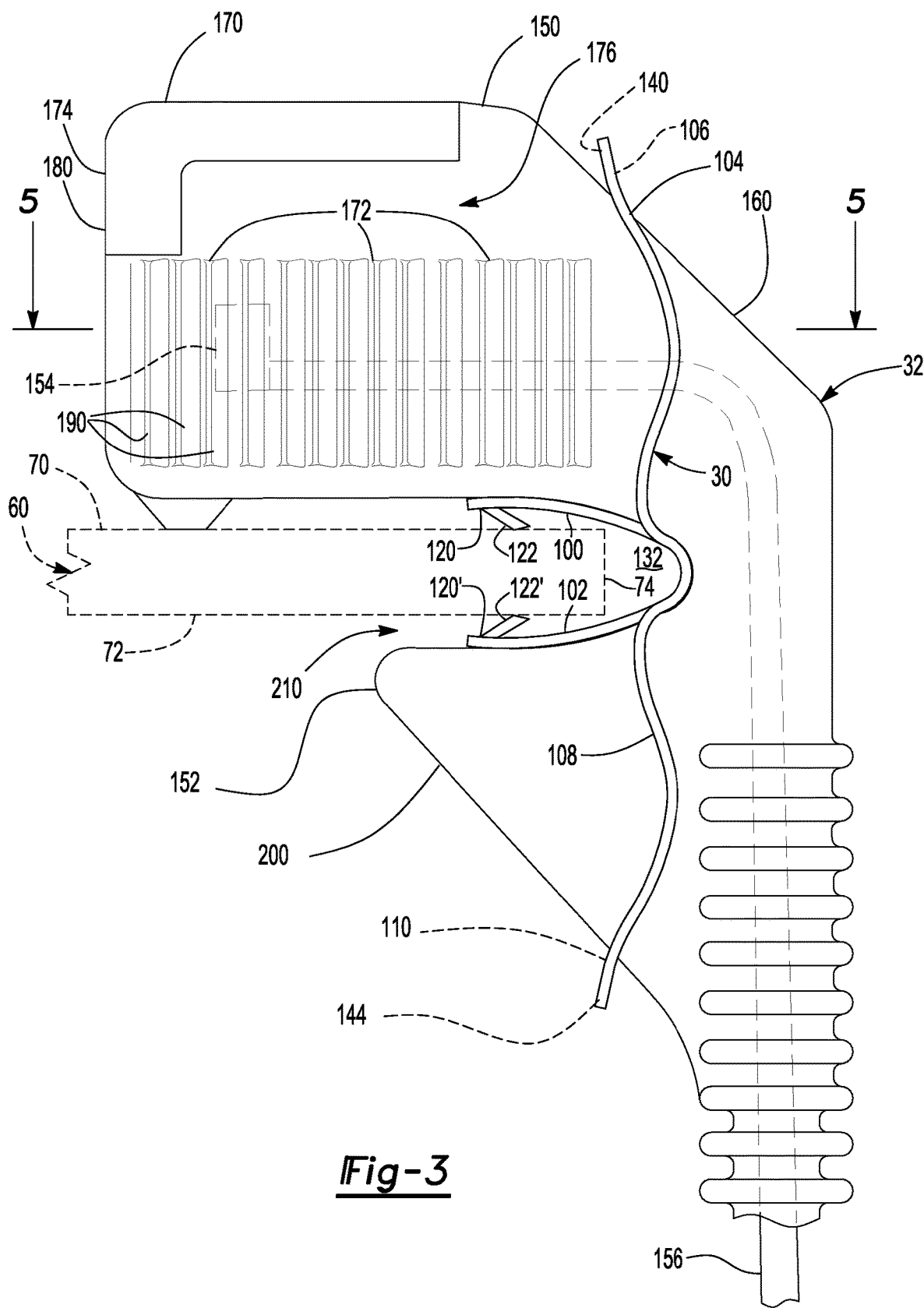
FIG. 3 is a side view of the sensor unit and the clip with the brake pad assembly shown in phantom for clarity.
Figure 4:
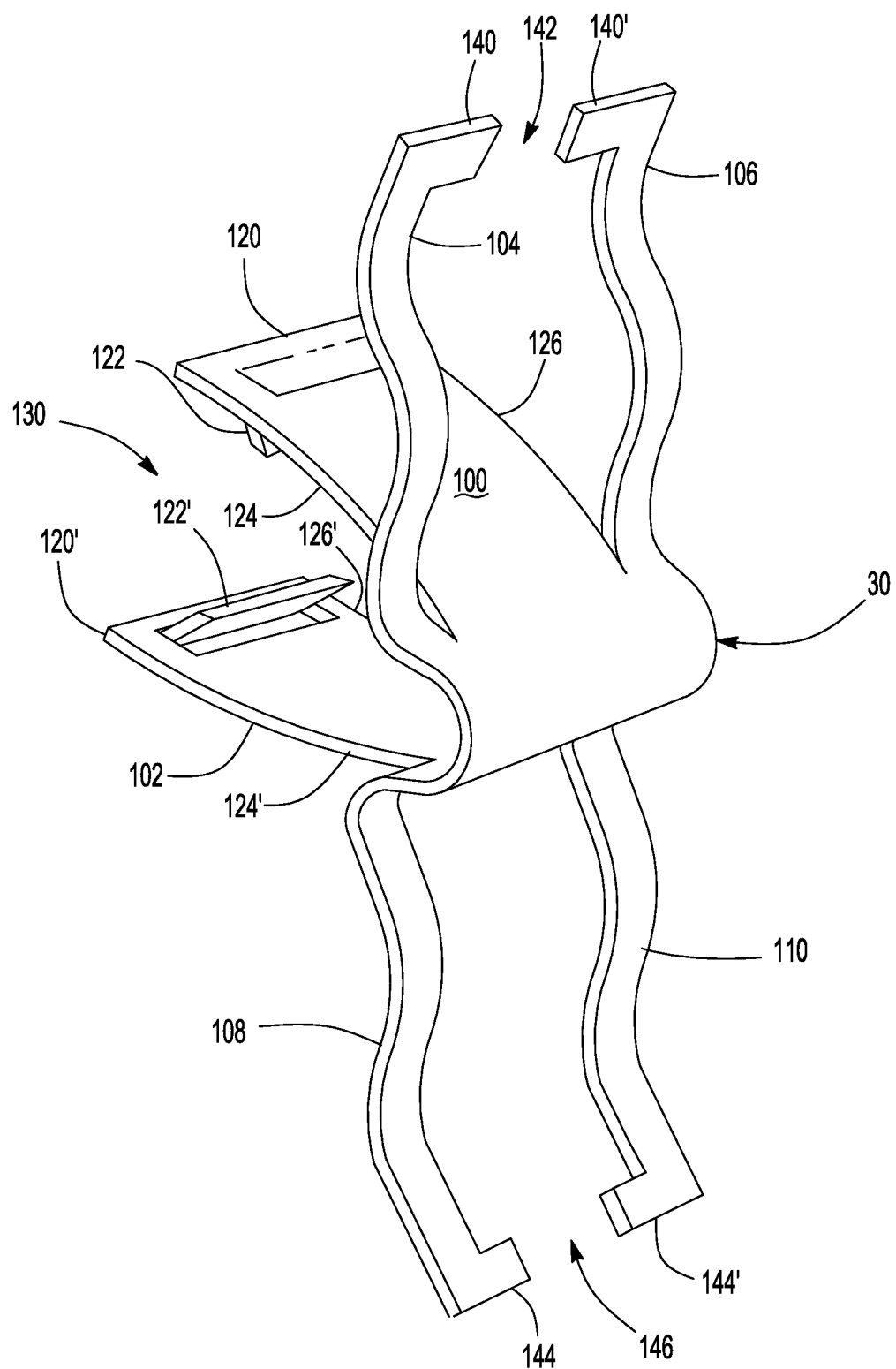
FIG. 4 is a perspective view of the clip.

Referring primarily to FIGS. 3 and 4, the clip 30 facilitates mounting of the sensor unit 32 to the brake pad assembly 24. For instance, the clip 30 is mounted to the brake shoe 50 and the sensor unit 32 is mounted to the clip 30. The clip 30 straddles and engages the table 60 and may extend into the channel 84 that is disposed between the first friction material portion 80 and the second friction material portion 82. The clip 30 may be made of any suitable material or materials. For example, the clip 30 may be made of a polymeric material or metal. The clip 30 may have a greater degree of stiffness or rigidity than at least a portion of the sensor unit 32. As such, the clip 30 may limit deformation of the sensor unit 32, such as bending, twisting, compression and the like. In at least one configuration, the clip 30 includes a first clip arm 100, a second clip arm 102. The clip 30 may also include a first side arm 104, a second side arm 106, a third side arm 108, a fourth side arm 110, or combinations thereof.

The first clip arm 100 is configured to engage or contact the table 60. For instance, the first clip arm 100 may engage the first table side 70 of the table 60. The first clip arm 100 may have a distal end 120. The distal end 120 may be received inside the channel 84. A retention barb 122 may be disposed proximate the distal end 120. The retention barb 122 may extend toward the first table side 70 and may contact or engage the first table side 70 to help secure the first clip arm 100 to the table 60 and inhibit removal of the clip 30. The first clip arm 100 may extend laterally between a first lateral side 124 and a second lateral side 126 that may be disposed opposite the first lateral side 124.

The second clip arm 102 may be disposed opposite the first clip arm 100. The second clip arm 102 is configured to engage or contact the table 60. For instance, the second clip arm 102 may engage the second table side 72 of the table 60 and may be spaced apart from the first table side 70. The second clip arm 102 may have a distal end 120'. The distal end 120' faces toward an adjacent web 62 of the brake shoe 50 and is not received inside the channel 84. A retention barb 122' may be disposed proximate the distal end 120'. The retention barb 122' may extend toward the second table side 72 and may contact or engage the second table side 72 to help secure the second clip arm 102 to the table 60 and inhibit removal of the clip 30. The second clip arm 102 may extend laterally between a first lateral side 124' and a second lateral side 126' that may be disposed opposite the first lateral side 124'. In at least one configuration, the first lateral side 124 may be contiguous with the first lateral side 124' and the second lateral side 126 may be contiguous with the second lateral side 126'.

The first clip arm 100 and the second clip arm 102 may cooperate to define an aperture 130. The aperture 130 is disposed between the first clip arm 100 and the second clip arm 102 and is configured to receive the table 60. In the configuration shown, the first clip arm 100 and the second clip arm 102 have substantially similar configurations and extend from each other; however, it is contemplated that the first clip arm 100 and the second clip arm 102 may not extend from each other. For instance, rather than having a generally parabolic profile as shown in FIG. 3, the first clip arm 100 and the second clip arm 102 may both extend from an intermediate wall that may bridge or connect the first clip arm 100 to the second clip arm 102. In the configuration shown, a gap 132 may be disposed between the table 60 and the closed end of the aperture 130. For example, the gap 132 may be disposed between the table end surface 74 and the clip 30 at the closed end of the aperture 130.

The first side arm 104 helps orient and retain the sensor unit 32 on the clip 30. The first side arm 104 may extend from the first clip arm 100. For instance, the first side arm 104 may extend from the first clip arm 100 in a direction that extends away from the second clip arm 102. The first side arm 104 may be positioned near the closed end of the aperture 130 and may extend away from the aperture 130. As such, the first side arm 104 may be spaced apart from the distal end 120 of the first clip arm 100. The first side arm 104 may be disposed proximate or may extend from the first lateral side 124 of the first clip arm 100. In at least one configuration, the first side arm 104 may be spaced apart from the second side arm 106 and may have a first hook 140.

The first hook 140 may be disposed proximate a distal end of the first side arm 104. The first hook 140 may be configured to engage and help secure the sensor unit 32 as will be discussed in more detail below. The first hook 140 may extend toward the second side arm 106.

The second side arm 106 helps orient and retain the sensor unit 32 on the clip 30. The second side arm 106 may be disposed opposite the first side arm 104. The second side arm 106 may extend from the first clip arm 100. For instance, the second side arm 106 may extend from the first clip arm 100 in a direction that extends away from the second clip arm 102. The second side arm 106 may be positioned near the closed end of the aperture 130 and may extend away from the aperture 130. As such, the second side arm 106 may be spaced apart from the distal end 120 of the first clip arm 100. The second side arm 106 may be disposed proximate or may extend from the second lateral side 126 of the first clip arm 100. In at least one configuration, the second side arm 106 may have a second hook 140'.

The second hook 140' may be disposed proximate a distal end of the second side arm 106. The second hook 140' may be configured to engage and help secure the sensor unit 32 as will be discussed in more detail below. The second hook 140' may extend toward the first side arm 104.

The first hook 140 and the second hook 140' may be spaced apart from each other such that a passage 142 is provided between the first hook 140 and the second hook 140'. It is also contemplated that the passage 142 may be omitted in one or more configurations. For instance, the first hook 140 and the second hook 140' may be contiguous rather than spaced apart from each other and form a bridge that may cooperate with the first clip arm 100, the first side arm 104, and the second side arm 106 to define an enclosed window that has a perimeter that is bounded and surrounded by these features.

The third side arm 108 helps orient and retain the sensor unit 32 on the clip 30. The third side arm 108 may extend from the second clip arm 102. For instance, the third side arm 108 may extend from the second clip arm 102 in a direction that extends away from the first clip arm 100. The third side arm 108 may be positioned near the closed end of the aperture 130 and may extend away from the aperture 130. As such, the third side arm 108 may be spaced apart from the distal end 120 of the second clip arm 102. The third side arm 108 may be disposed proximate or may extend from the first lateral side 124' of the second clip arm 102. For example, the third side arm 108 may be disposed opposite the first side arm 104 and may be oriented such that the first side arm 104 and the third side arm 108 extend in opposite directions with respect to each other. In at least one configuration, the third side arm 108 may be spaced apart from the fourth side arm 110 and may have a third hook 144.

The third hook 144 may be disposed proximate a distal end of the third side arm 108. The third hook 144 may be configured to engage and help secure the sensor unit 32 as will be discussed in more detail below. The third hook 144 may extend toward the fourth side arm 110.

The fourth side arm 110 helps orient and retain the sensor unit 32 on the clip 30. The fourth side arm 110 may be disposed opposite the third side arm 108. The fourth side arm 110 may extend from the second clip arm 102. For instance, the fourth side arm 110 may extend from the second clip arm 102 in a direction that extends away from the first clip arm 100. The fourth side arm 110 may be positioned near the closed end of the aperture 130 and may extend away from the aperture 130. As such, the fourth side arm 110 may be spaced apart from the distal end 120 of the second clip arm 102. The fourth side arm 110 may be disposed proximate or may extend from the second lateral side 126' of the second clip arm 102. For example, the fourth side arm 110 may be disposed opposite the second side arm 106 and may be oriented such that the second side arm 106 and the fourth side arm 110 extend in opposite directions with respect to each other. In at least one configuration, the fourth side arm 110 may have a fourth hook 144'.

The fourth hook 144' may be disposed proximate a distal end of the fourth side arm 110. The fourth hook 144' may be configured to engage and help secure the sensor unit 32 as will be discussed in more detail below. The fourth hook 144' may extend toward the third side arm 108.

The third hook 144 and the fourth hook 144' may be spaced apart from each other such that a passage 146 is provided between the third hook 144 and the fourth hook 144'. It is also contemplated that the passage 146 may be omitted in one or more configurations.

Referring to FIGS. 2 and 3, the sensor unit 32 straddles the clip 30 and the table 60 such that the sensor unit 32 engages opposing sides of the clip 30 that face away from the table 60. For instance, the sensor unit 32 may straddle and contact or engage sides of the first clip arm 100 and the second clip arm 102 that face away from the table 60. In at least one configuration, the sensor unit 32 may include a first lug 150, a second lug 152, at least one sensor 154, and at least one electrical conductor 156.

Referring primarily to FIG. 3, the first lug 150 may be disposed on a side of the table 60 from which the friction material 52 extends. For instance, the first lug 150 may extend from the first table side 70. The first lug 150 may be received in the channel 84 that is disposed between the first friction material portion 80 and the second friction material portion 82. At least one sensor 154 may be disposed inside the first lug 150.

The first lug 150 is configured to contact or engage the first clip arm 100 of the clip 30. The first lug 150 may have a greater length than the clip 30. For instance, the first lug 150 may extend past the distal end 120 of the first clip arm 100. The first lug 150 may also have a greater length than the second lug 152. The first lug 150 may or may not contact the first table side 70.

The first lug 150 may be laterally positioned between the first side arm 104 and the second side arm 106 of the clip 30, such as by inserting the first lug 150 through the passage 142 of the clip 30. For instance, the first side arm 104 may extend along a first lateral side of the first lug 150 while the second side arm 106 may extend along a second lateral side of the first lug 150 that is disposed opposite the first lateral side. It is noted that the second side arm 106 is disposed directly behind the first side arm 104 in FIG. 3.

The first hook 140 of the first side arm 104 and the second hook 140' of the second side arm 106 may be configured to engage the first lug 150. For instance, the first hook 140, the second hook 140', or both may engage a first upper surface 160 of the first lug 150 that faces away from the first clip arm 100 and that may be at least partially disposed outside of the channel 84. Alternatively or in addition, the first hook 140 and the second hook 140' may be configured to engage opposing lateral sides of the first lug 150. As such, the first hook 140 and the second hook 140' may help inhibit movement of the first lug 150 in a direction that extends away from the first table side 70.

The first lug 150 may have various features that may help position, secure, or facilitate installation of the first lug 150. For example, the first lug 150 may include one or more wings 170, one or more ramps 172, one or more slot end walls 174, one or more slots 176, or combinations thereof. The first lug 150 will be described below as having the same features on both lateral sides of the first lug 150 unless otherwise specified.

One or more wings 170 may be disposed proximate the top of the first lug 150. As such, a wing 170 may be disposed proximate a top side of the first lug 150 that is disposed opposite the table 60. A wing 170 may protrude from the first lug 150 and extend toward a portion of the friction material 52. For instance, a first wing 170 may extend toward the first friction material portion 80 while a second wing 170 may be disposed opposite the first wing 170 and may extend toward the second friction material portion 82. The wings 170 may be at least partially received in the channel 84 and may rest on a chamfered or angled surface of the friction material 52 to help resist over-compression or mispositioning of the first lug 150 in a direction that extends toward the table 60. As such, the wings 170 may help position a sensor 154 that is disposed inside of the first lug 150 at a desired elevation from the first table side 70.

Figure 5:
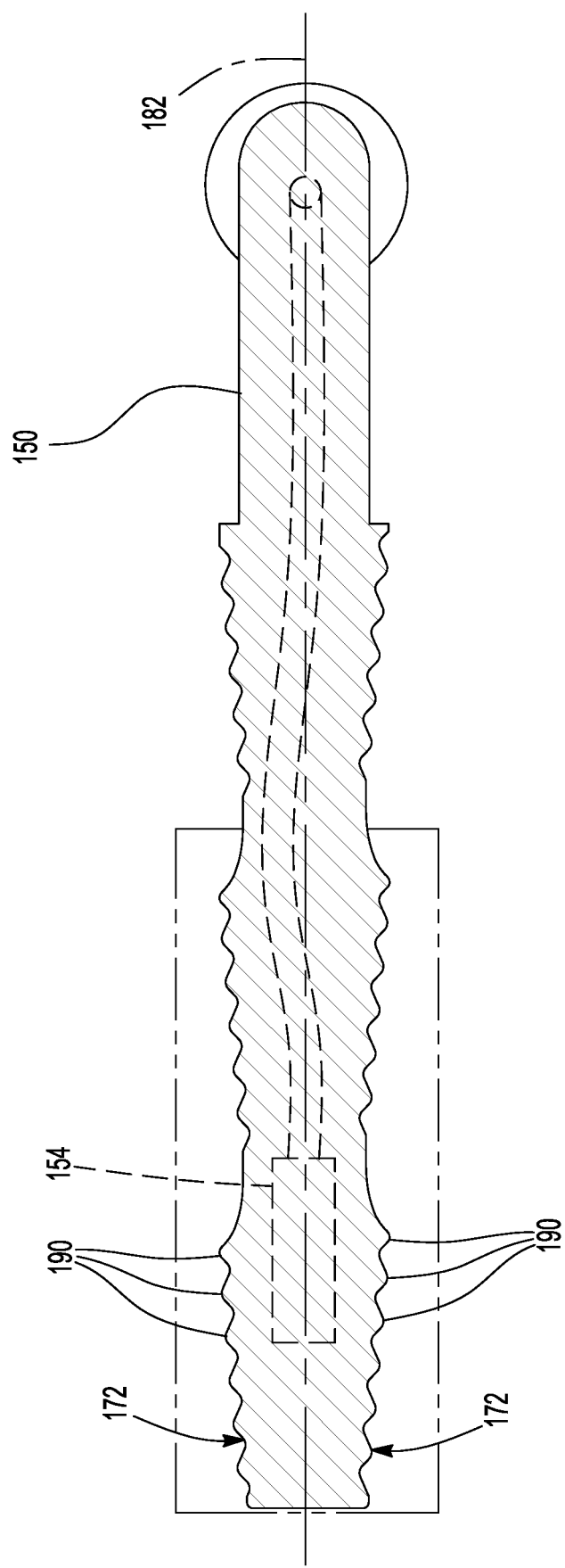
FIG. 5 is a top view of a portion of a first lug of the sensor unit in a free state showing examples of ramps that extend from the first lug.

One or more ramps 172 may protrude from the first lug 150 toward the friction material 52. For instance, a first ramp or a first set of ramps 172 may extend toward the first friction material portion 80 while a second ramp or a second set of ramps 172 may be generally disposed opposite the first ramp or the first set of ramps 172 and may extend toward the second friction material portion 82. The ramps 172 may be received in the channel 84. In at least one configuration, the ramps 172 may be spaced apart from the wings 170. For example, the ramps 172 may be disposed closer to the first table side 70 than the wings 170. In FIG. 3, a set of ramps 172 is illustrated that includes three ramps 172; however, it is contemplated that a greater or lesser number of ramps may be provided. The ramps 172 may be arranged between a distal end 180 of the first lug 150 and the first and second side arms 104, 106. The ramps 172 may be compressed or deformed when inserted into the channel 84 to help inhibit removal of the first lug 150 from the channel 84. In a free state or uncompressed state like that shown in FIGS. 3 and 5, the ramps 172 may be angled to protrude farther outboard as the distance from the distal end 180 of the first lug 150 increases. For instance, as is best shown in FIG. 5 a ramp 172 may extend farther away from a center plane 182 as the distance from the distal end 180 increases, noting that the distal end 180 is positioned farther upward in FIG. 5 from the perspective shown. The center plane 182 may be a plane that may extend through the first lug 150 and the second lug 152 and may be disposed proximate the center of the sensor unit 32. The center plane 182 may be positioned between or centered between the first friction material portion 80 and the second friction material portion 82 when the sensor unit 32 is installed in the channel 84. Orienting the ramps 172 in this manner may make it easier to insert the first lug 150 into the channel 84 as compared to removing the first lug 150 from the channel 84.

Optionally, a ramp 172 may include a set of teeth 190. The teeth 190 may extend between the first table side 70 and a corresponding wing 170, or in a generally vertical direction from the perspective shown in FIG. 3. The teeth 190 may extend away from the center plane 182 and may help grip a corresponding friction material portion. As is best shown in FIG. 5, the teeth 190 of ramps 172 that extend from opposite lateral sides of the first lug 150 may be offset from each other. For instance, the teeth 190 of a first ramp 172 may be offset from the teeth 190 of a second ramp 172 such that the peaks of the teeth are not aligned. In the example shown, the teeth 190 are positioned out of phase such that the peak of a tooth 190 that extends from a first ramp 172 is aligned with the valley between adjacent teeth 190 of an opposing second ramp 172. Such positioning may help improve gripping effectiveness of the teeth 190.

Referring to FIG. 3, one or more slot end walls 174 may be generally disposed between a wing 170 and a ramp 172. In the configuration shown, a slot end wall 174 extends from the wing 170 toward the table 60 and optionally toward or to a ramp 172. As such, the slot end wall 174 may be disposed in the channel 84 when the sensor unit 32 is mounted to the table 60. The slot end wall 174 may protrude laterally from the first lug 150 and extend toward a portion of the friction material 52. For example, a first slot end wall 174 may extend toward the first friction material portion 80 while a second slot end wall 174 may be disposed opposite the first slot end wall 174 and may extend toward the second friction material portion 82. The slot end wall 174 may be disposed closer to the distal end 180 of the first lug 150 than to the first and second side arms 104, 106 of the clip 30. The slot end wall 174 may form a closed end of the slot 176 and may be engaged by a tool that facilitates installation of the first lug 150.

One or more slots 176 may be provided with the first lug 150. A slot 176 may be positioned between a wing 170 and a ramp or set of ramps 172. In addition, a slot 176 may extend from a corresponding slot end wall 174 in a direction that extends away from the distal end 180 of the first lug 150. Thus, a slot 176 may be disposed between a wing 170, the set of ramps 172, and the slot end wall 174 and may be open at an end that is disposed opposite the slot end wall 174. A corresponding slot 176 may be disposed on an opposite side of the first lug 150. A slot 176 may be configured to receive a tool that may facilitate installation of the first lug 150 into the channel 84. For example, a rod or shaft may be inserted into the open end of the slot 176 and placed in engagement with the slot end wall 174. Force may be exerted toward the slot end wall 174 that may move the first lug 150 into the channel 84 and inhibit the first lug 150 from binding during insertion. Over-insertion or stretching of the first lug 150 by the tool may be resisted by the clip 30.

The second lug 152 may be disposed on an opposite side of the table 60 from the first lug 150. As such, the second lug 152 may be disposed adjacent to the second table side 72 and may not be received in the channel 84. The second lug 152 is configured to contact or engage the second clip arm 102 of the clip 30. The second lug 152 may have a greater length than the clip 30. For instance, the second lug 152 may extend past the distal end 120' of the second clip arm 102. The second lug 152 may or may not contact the second table side 72.

The second lug 152 may be laterally positioned between the third side arm 108 and the fourth side arm 110 of the clip 30, such as by inserting the second lug 152 through the passage 146 of the clip 30. For instance, the third side arm 108 may extend along a first lateral side of the second lug 152 while the fourth side arm 110 may extend along a second lateral side of the second lug 152 that is disposed opposite the first lateral side. It is noted that the fourth side arm 110 is disposed directly behind the third side arm 108 in FIG. 3.

The third hook 144 of the third side arm 108 and the fourth hook 144' of the fourth side arm 110 may be configured to engage the second lug 152. For instance, the third hook 144, the fourth hook 144', or both may engage a side surface 200 of the second lug 152 that faces away from the second clip arm 102 and that may be disposed outside of the channel 84. Alternatively or in addition, the third hook 144 and the fourth hook 144' may be configured to engage opposing lateral sides of the second lug 152. As such, the third hook 144 and the fourth hook 144' may help inhibit movement of the second lug 152 in a direction that extends away from the second table side 72.

Referring to FIG. 3, the first lug 150 and the second lug 152 may cooperate to define a recess 210 that receives the clip 30. The recess 210 may be defined by a side of the first lug 150 that faces toward and may engage the first clip arm 100 and a side of the second lug 152 that faces toward and may engage the second clip arm 102.

The first lug 150 and the second lug 152 may be integrally formed as a unitary one-piece component. For instance, the first lug 150 and the second lug 152 may be integrally formed of a polymeric material, such as silicone that can withstand the temperatures associated with braking while maintaining sufficient structural integrity (e.g., without melting). Moreover, such a material may limit heat absorption and help provide a degree of thermal insulation that may help protects sensor 154 inside the sensor unit 32.

Features of the sensor unit 32 may also be used facilitate removal from the channel 84. For instance, the first lug 150, the second lug 152, portion of the sensor unit 32 that extends around or encapsulates the electrical conductors 156, or combinations thereof may be grasped and pulled to disengage the sensor unit 32.

At least one sensor 154 may be encapsulated in the first lug 150 of the sensor unit 32. For instance, the sensor 154 may be positioned between the inner side and an opposing outer side of the first lug 150 that faces away from the table 60 when the first lug 150 is unworn. The sensor 154 may provide a signal indicative of wear of the friction material 52. For example, the friction material 52 may contact the brake drum 22 during braking, which may cause the friction material 52 to wear and decrease in thickness. After sufficient wear occurs, the side of the friction material 52 that faces toward the brake drum 22 may be generally aligned with the outer side of the first lug 150. As a result, additional brake applications may result in engagement of the friction material 52 and the first lug 150 with the brake drum 22 and wear of both the friction material 52 and the first lug 150.

After sufficient wear occurs, the sensor 154 or a portion thereof may be exposed and may contact the brake drum 22 during braking and provide a signal that may be indicative of wear of the friction material 52 and that the brake pad assembly 24 should be replaced. For example, the signal may be generated by the sensor 154 or may be associated with opening or closing an electrical circuit. For instance, the engagement of the brake drum 22 with the sensor 154 may sever or otherwise disconnect a normally continuous electrical circuit, resulting in a change to one or more electrical attributes, such as current or voltage, which may be detected or identified by an electronic controller that may receive the signal in a manner known by those skilled in the art.

In addition or alternatively, the sensor 154 may provide a signal indicative of temperature of the brake pad assembly 24. For example, the sensor 154 may include a thermocouple, thermistor, semiconductor temperature sensor, or the like.

It is contemplated that the sensor 154 may include a printed circuit board that is encapsulated in the first lug 150. The material of the first lug 150 may extend through holes in the printed circuit board during manufacture to help hold the sensor 154 in a desired position. It is also contemplated that a rod, pin, or the like may be molded into the first lug 150 to help stiffen the first lug 150 so that the sensor 154 remains in a desired position with respect to the brake pad assembly 24 when the sensor unit 32 is mounted to the table 60.

One or more electrical conductors 156 may be electrically connected to the sensor 154 or sensors provided with the sensor unit 32. An electrical conductor 156 may be of any suitable type, such as a wire, ribbon, or the like. An electrical conductor 156 may be provided with an insulator or coating that may help withstand operating temperatures. For instance, in electrical conductor 156 may be lacquer-coated, which may also help reduce the amount of sheathing or insulating material provided around an electrical conductor 156. The electrical conductor 156 may provide power to the sensor 154, provide a signal to an external control system or electronic controller, or both. The electrical conductor 156 may be partially protected by the clip 30. For example, the first clip arm 100, the second clip arm 102, and the closed end of the clip 30 may prevent the table 60 from cutting or damaging the material the encapsulates the electrical conductor 156. An electrical conductor 156 may be surrounded or encircled by annular protrusions or ribs that may help provide abrasion resistance and thermal separation.

A brake assembly as previously described may allow a sensor to be mounted to a brake pad assembly by clipping the sensor unit to a brake shoe. Such a configuration may permit the sensor unit to be compatible with multiple brake pad assembly configurations. In addition, such a configuration may allow a sensor unit to be installed or removed independent from the manufacturer of the brake pad assembly. For instance, a sensor unit may be used instead of a sensor that is received inside of the friction material or that is installed in place of a rivet that secures the friction material to the table during the brake pad assembly manufacturing process. As such, a sensor unit may be compatible with a brake pad assembly that is not manufactured with a sensor and may allow a brake pad assembly to be retrofitted with a sensor unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a brake pad assembly having a table and friction material that extends from the table;
    a clip that straddles and engages the table; and
    a sensor unit that straddles the clip and the table such that the sensor unit engages opposing sides of the clip that face away from the table.

2. The brake assembly of claim 1 wherein the sensor unit has a first lug and a second lug that cooperate to define a recess that receives the clip, wherein a sensor is disposed inside the first lug.

3. The brake assembly of claim 2 wherein the table includes:
    a first table side from which the friction material extends;
    a second table side that is disposed opposite the first table side; and
    a table end surface that extends between the first table side and the second table side;
    and the clip includes:
    a first clip arm that engages the first table side and the first lug; and
    a second clip arm that engages the second table side and the second lug.

4. The brake assembly of claim 3 wherein a gap is disposed between the table end surface and the clip.

5. The brake assembly of claim 3 wherein the first lug extends past a distal end of the first clip arm and the second lug extends past a distal end of the second clip arm.

6. The brake assembly of claim 3 wherein the clip includes a first side arm and a second side arm that extend from the first clip arm, wherein the first lug is disposed between the first side arm and the second side arm.

7. The brake assembly of claim 6 wherein the first side arm is spaced apart from the second side arm.

8. The brake assembly of claim 6 wherein the first side arm has a first hook, the second side arm has a second hook, and the first hook and the second hook engage a side of the first lug that faces away from the first clip arm.

9. The brake assembly of claim 8 wherein the first hook extends toward the second hook, the second hook extends toward the first hook, and the first hook is spaced apart from the second hook such that a passage is provided between the first hook and the second hook.

10. The brake assembly of claim 2 wherein the friction material includes a first friction material portion and a second friction material portion, a channel is provided between the first friction material portion and the second friction material portion, and the first lug is received in the channel.

11. The brake assembly of claim 10 wherein the first lug has a first slot end wall that is disposed in the channel, and a first slot that extends from the first slot end wall and extends away from a distal end of the first lug.

12. The brake assembly of claim 11 wherein the first lug has a first wing that is disposed in the channel and extends toward the first friction material portion, and a first ramp that is disposed in the channel and spaced apart from the first wing, wherein the first slot is disposed between the first wing and the first ramp.

13. The brake assembly of claim 10 wherein the first lug has a first ramp that engages the first friction material portion and a second ramp that engages the second friction material portion.

14. The brake assembly of claim 13 wherein a center plane extends through the first lug and the second lug and is positioned between the first friction material portion and the second friction material portion when the first lug is received in the channel, wherein the first ramp has a first ramp side that is angled to extend farther from the center plane as the first ramp extends farther from a distal end of the first lug when the first ramp is in a free state.

15. The brake assembly of claim 14 wherein the second ramp has a second ramp side that is angled to extend farther from the center plane as the second ramp extends farther from the distal end of the first lug when the second ramp is in the free state.

16. The brake assembly of claim 15 wherein the first ramp side has a first set of teeth and the second ramp side has a second set of teeth that face away from the center plane.

17. The brake assembly of claim 16 wherein the first set of teeth is offset from the second set of teeth.

18. The brake assembly of claim 3 wherein the clip includes a third side arm and a fourth side arm that extend from the second clip arm, wherein the second lug is disposed between the third side arm and the fourth side arm.

19. The brake assembly of claim 18 wherein the third side arm has a third hook, the fourth side arm has a fourth hook, and the third hook and the fourth hook engage a side of the second lug that faces away from the second clip arm.

20. The brake assembly of claim 19 wherein the third hook extends toward the fourth hook, the fourth hook extends toward the third hook, and the third hook is spaced apart from the fourth hook such that a passage is provided between the third hook and the fourth hook.

21. A clip and sensor unit assembly comprising:
a clip that comprises:
a first clip arm and a second clip arm that cooperate to define an aperture that is adapted to receive a table of a brake pad assembly; and
a sensor unit that comprises:
a first lug and a second lug that cooperate to define a recess that receives the clip, wherein the sensor unit straddles the clip and the aperture such that the sensor unit engages a side of the first clip arm that faces away from the aperture and engages a side of the second clip arm that faces away from the aperture.

22. The clip and sensor unit assembly of claim 21 wherein the first lug extends past a distal end of the first clip arm and the second lug extends past a distal end of the second clip arm.

23. The clip and sensor unit assembly of claim 21 wherein the clip includes a first side arm and a second side arm that extend from the first clip arm, wherein the first lug is disposed between the first side arm and the second side arm.

24. The clip and sensor unit assembly of claim 23 wherein the first side arm has a first hook, the second side arm has a second hook, and the first hook and the second hook engage a side of the first lug that faces away from the first clip arm.

* * * * *